United States Patent [19]

Hubert et al.

[11] 4,317,793

[45] Mar. 2, 1982

[54] PROCESS FOR THE PRODUCTION OF ORIENTED HOLLOW BODIES

[75] Inventors: Guy Hubert, Lasne-Chapelle-Saint-Lambert; Edmond Michel, Brussels, both of Belgium

[73] Assignee: Solvay & Cie, Brussels, Belgium

[21] Appl. No.: 178,342

[22] Filed: Aug. 14, 1980

Related U.S. Application Data

[63] Continuation of Ser. No. 931,734, Aug. 7, 1978, abandoned.

[30] Foreign Application Priority Data

Aug. 8, 1977 [FR] France ................................. 77 24579

[51] Int. Cl.³ .............................................. B29C 17/07
[52] U.S. Cl. .................................. 264/521; 264/530; 264/532; 425/525; 425/530; 425/534
[58] Field of Search .............. 264/530, 532, 533, 521; 425/525, 529, 530, 534

[56] References Cited

U.S. PATENT DOCUMENTS

| | | |
|---|---|---|
| 3,429,211 | 2/1969 | Pelot et al. . |
| 3,585,683 | 6/1971 | Wilson .................. 425/525 |
| 3,651,186 | 3/1972 | Hall ..................... 425/529 X |
| 3,769,394 | 10/1973 | Liatreille ............. 425/525 X |
| 3,800,638 | 4/1974 | Duikers et al. . |
| 3,801,690 | 4/1974 | Gilbert ................ 425/530 X |
| 3,833,332 | 9/1974 | Amberg et al. . |
| 3,873,660 | 3/1975 | Reilly et al. ......... 425/529 X |
| 3,886,824 | 6/1975 | Michel et al. . |
| 3,940,225 | 2/1976 | Uhlig .................... 425/530 |
| 3,949,033 | 4/1976 | Uhlig . |
| 4,049,761 | 9/1977 | Lorge et al. . |
| 4,080,146 | 3/1978 | Hellmer . |
| 4,120,634 | 10/1978 | Michel et al. ....... 425/525 |

FOREIGN PATENT DOCUMENTS

| | | |
|---|---|---|
| 837324 | 7/1976 | Belgium . |
| 838910 | 8/1976 | Belgium . |
| 2021521 | 9/1969 | France . |
| 2062304 | 6/1971 | France . |
| 2293297 | 12/1974 | France . |

OTHER PUBLICATIONS

*The Society of the Plastic Industry,* "Plastic Bottle Glossary," 9, 1966.
B. E. Moody, *Packaging in Glass,* pp. 11, 12 (2-4-64).
F. V. Tooley, *Handbook of Glass Manufacture,* "Feeding and Forming", 1953, vol. 1, pp. 303-305.

*Primary Examiner*—Jan H. Silbaugh
*Attorney, Agent, or Firm*—Spencer & Kaye

[57] ABSTRACT

A process for producing molecularly oriented hollow bodies of thermoplastic material presenting an accurately dimensioned orifice collar, by blow molding a preform in a manner to produce the orifice collar in its definitive form and, after thermally conditioning the preform, finally blow molding the desired final hollow body while forming the lower molded part of the neck below the orifice collar. This process permits the production of oriented hollow bodies with which a closure member can form an effective seal, and which can therefore be used for packaging carbonated beverages.

11 Claims, 3 Drawing Figures

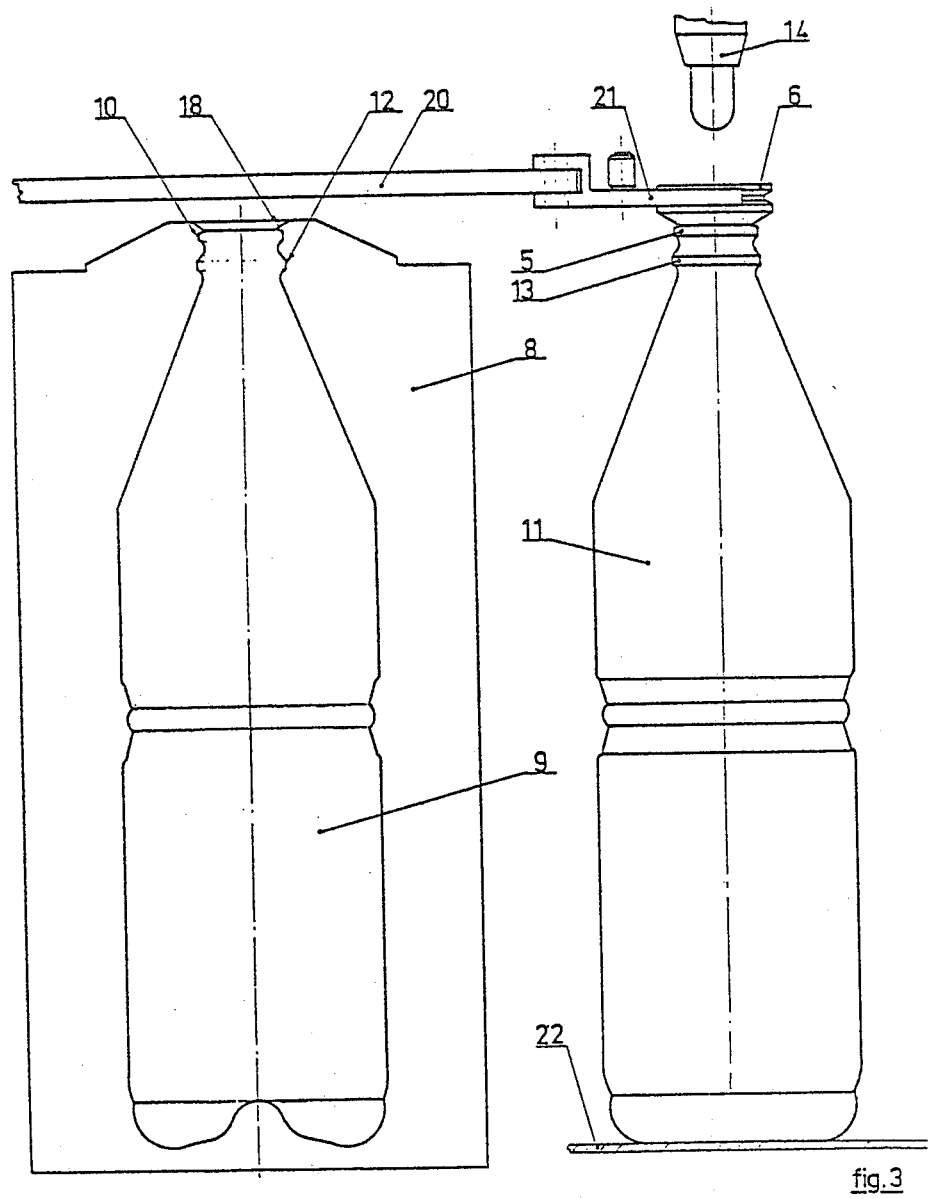

PROCESS FOR THE PRODUCTION OF ORIENTED HOLLOW BODIES

CROSS REFERENCE TO RELATED APPLICATION

This application is a continuation of application Ser. No. 931,734, filed Aug. 7, 1978, and now abandoned.

BACKGROUND OF THE INVENTION

The present invention relates to a process for producing oriented hollow bodies of thermoplastic material, such as bottles and similar articles, of the type provided with a neck carrying an orifice collar, or finish, at its upper part for permitting the application of a sealing closure member, such as a cap or stopper.

It is already known to produce hollow bodies of thermoplastic material which possess substantially improved mechanical properties by resorting to production techniques leading to an orientation, preferably biaxial, of the macromolecules constituting their wall. According to a technique currently used for producing such hollow bodies, a first step involves the blowing of preforms of generally cylindrical shape, generally having a closed bottom and a neck molded into its final form, i.e. the form it will have in the finished article. Such preforms are then thermally conditioned in order to bring them to an optimal temperature to undergo orientation by stretching. Then, these conditioned preforms are blown in a final blowing operation in order to give them the form of the desired final article. The diameter and length of such a preform are selected to cause it to be substantially stretched, preferably biaxially, during the final blow molding.

It is indispensable that the hollow articles produced according to this technique be capable of being provided with a perfectly tight closure. It is for this reason that their necks are usually molded not during the final blow molding, but during the preform blow molding. In effect, since the thermoplastic material is at a relatively high temperature during blow molding of the preforms, the final neck can be molded at that time so as to assure a perfect reproduction of the desired configuration and a precise dimensioning of the orifice.

In contrast, it is not possible to mold the neck in a satisfactory manner during the final blow molding, which of necessity takes place at relatively low temperature, without resorting to extremely complex techniques such as those described in U.S. Pat. No. 3,651,186, issued on Mar. 21, 1972. It is for this reason that it is presently preferred to definitively mold the neck during preform blow molding.

Unfortunately, definitive molding of the neck during preform blow molding presents serious drawbacks. Thus, when the region of the neck is not axially symmetrical, for example because it is threaded, it is necessary to take special precautions to transfer the resulting preforms without damaging the neck and to correctly position them in the final blow mold. In addition, the thermoplastic material is inefficiently utilized at the level of the neck since the wall necessarily has a thickness almost equal to that of the starting tubular parison and has relatively poor mechanical properties since it is not oriented.

SUMMARY OF THE INVENTION

It is an object of the present invention to overcome the above-noted shortcomings of prior art processes for producing such bottles and similar articles.

A more specific object of the invention is to provide a novel process which permits, in a remarkably simple manner, production of articles of the above-described type which are capable of being closed in a perfectly tight manner.

These and other objects are achieved according to the present invention, in a process for the production of an oriented hollow body of thermoplastic material provided with a neck having an orifice collar at its upper part and a lower molded part, in which a hot tubular parison of thermoplastic material is initially blow molded to produce a preform, the resulting preform is thermally conditioned to a temperature capable of inducing orientation of the thermoplastic material during subsequent stretching, and the preform is subjected to a final blow molding operation in which the preform is stretched and formed into the desired final hollow body, by giving the orifice collar at the upper part of the neck its definitive form during the initial preform blow molding operation, and forming the lower part of the neck during the final blow molding operation.

The form and dimensions of the orifice collar are not critical and are selected, in general, on the basis of the closure which it is desired to utilize for the finished hollow body. Thus, the collar can have a rounded profile at its upper part and at right angles to its lower part when it is desired to close the hollow body by a metal, pry-off cap. For other types of closures, such as screw-type stoppers, the collar can have a circular or rectangular cross section, for example. In general, the height of the collar is between 1 and 10 mm and its thickness is between 0.5 and 5 mm.

In the process according to the invention, the orifice collar can be molded with a very high precision since the thermoplastic material can be brought to that temperature which is ideal for assuring accurate conformance to mold details and dimensional accuracy during production of the preforms. Moreover, transfer of the preforms no longer poses any problem and their positioning in the final blow mold is greatly simplified since the orifice collar can be made axially symmetrical without thereby creating any inconveniences. By this fact, the problem of angular positioning of the preforms is eliminated and it is only necessary to direct attention to the height positioning, which can be done very simply since it can even be performed by action of gravity. Finally, the process according to the present invention offers the possibility of stretching the lower portion of the neck during its molding by the final blow molding operation.

The preforms usable in processes according to the present invention can be in any form, provided that they carry, at the upper portion of their neck, in the zone adjacent the mouth, or opening, of the hollow body, an orifice collar molded into its definitive, or final, form.

According to a preferred embodiment, the preforms are provided with a false neck, or mouth, located above the orifice collar. This false neck is eliminated either before or after final blowing. Generally, the thermoplastic material constituting the false neck is recycled by grinding the thermoplastic material. This false neck can be advantageously used for the blowing of the preform by means of a needle, or for the transfer and positioning of the preform. The false neck can be closed or open, depending on the blowing technique used for molding the preform, and it can be provided with ribs, grooves and lugs, depending on the use which is to be made of the false neck.

According to an equally preferred embodiment, the preforms utilized present a closed hemispheric base and a body of generally cylindrical form. The maximum diameter of the preform is preferably between 20 and 80% of the maximum diameter of the oriented hollow body which is to be produced from the preform. The height can be equal to that of the final desired hollow body but, in general, it is preferred that the height of the preform be between 20 and 80% of the height of the final oriented hollow body which is to be produced from this preform.

Such preforms are molded from a hot tubular parison of thermoplastic material, the production of which does not present any particular difficulty and can be effected by a conventional tube extruder.

The technique utilized for blow molding the preform can be of any type, provided that it permits formation of an orifice collar which is accurately molded into its definitive form. Thus, use can advantageously be made of the process described in U.S. Pat. No. 4,049,761, issued to Lorge et al. on Sept. 20, 1977, which relates precisely to the production of preforms provided with a hemispherical base. One can refer to that patent for the production of preforms usable according to the present invention, while of course taking into account that the neck of the preform should not be molded in its entirety but should only carry an orifice collar at its upper part.

According to a preferred variation of the process according to the invention, the false neck, which is preferably produced on the preform, is retained during the final blowing operation and at least its upper portion projects out of the final blow mold. In this manner, the false neck can be used to aid the introduction of the preform into the final blow mold as well as positive extraction of the resulting oriented hollow body by means of a gripping organ acting at the level of the false neck. The false neck can, in this case, be subsequently eliminated by a cutting off operation. To this end, use can advantageously be made of the cutting off apparatus described in Belgian Pat. Nos. 673,913 filed on Dec. 17, 1965 and corresponding U.S. Pat. No. 3,429,211; 774,525 filed on Oct. 27,1971 and corresponding U.S. Pat. No. 3,800,638; and 809,448 filed on Jan. 7, 1974 and corresponding U.S. Pat. No. 3,886,824.

For this purpose, the preform could be formed to have a groove forming an angle between the orifice collar and the false neck so as to facilitate the action of the cutting tool, or cutter. For the cutting off, positioning of the preform, or the final molded article, could be assured by the false neck itself.

When the final blow molding of a thermally conditioned preform is effectuated by means of a blowing nozzle which is inserted into the preform, and the preform is of the type having a closed false neck, it is obviously in order to provide, before the final blowing, a cutting off of the top of the false neck in order to provide an opening permitting insertion of the blowing nozzle into the preform.

It is advantageous for the molding of the preform to be utilized for conditioning the resulting preform by cooling it or, at least, for initiating the thermal conditioning. This result can particularly be achieved by equipping each preform mold with suitable means such as refrigerating fluid conduits, or channels.

Thermal conditioning can be effected or pursued by the usual means, and for example in one or several thermostatically controlled enclosures in which preforms remain after unmolding and before their introduction into respective final blow molds.

The thermal conditioning can consist in cooling the preforms in a manner to bring them into the desired temperature range, or in cooling them more strongly and then reheating them to bring them into this range. The temperature is obviously selected on the basis of the nature of the thermoplastic material being used.

For the thermal conditioning, it is possible to bring the preforms to a uniform temperature throughout their entire useful height or throughout their entire thickness. It is also possible to create a programmed thermal variation along the preforms. Thus, it can be advantageous to bring the region of each preform situated just below the orifice collar to a temperature slightly higher than the rest of the preform in a manner to aid the stretching, or drawing, and therefore the thinning out of this region during the final blow molding.

During thermal conditioning of the preforms, it is obviously not necessary to treat the false necks as well as the orifice collars since the former is subsequently removed and the latter is already molded into its definitive form.

After having been thermally conditioned, the preforms are introduced into respective final blow molds in which they are given the definitive form of the desired, oriented hollow bodies and where, in particular, the lower part of the neck, below the orifice collar, is molded.

According to a preferred embodiment of the process according to the invention, the final blow molding is performed with the aid of a blowing nozzle which is inserted into each preform and is designed in a manner to participate in the axial stretching of the preform before or during its blowing. It is particularly advantageous to utilize, for this purpose, the blowing technique which is described in Belgian Pat. No. 838,910, filed Feb. 2, 1976.

During the final blowing, it is in order to correctly position the orifice collar of the preform in a recess provided in the mold cavity in order to avoid any deterioration of this collar.

The seal between the blowing nozzle and the preform during final blowing can be assured by causing the nozzle to bear directly on the orifice collar. The nozzle can equally bear against the false neck of the preform and more particularly against its lower part. The blowing nozzle can, in these two cases, be simultaneously employed for assuring internal dimensioning of the true neck of the resulting article.

Any form can be given to the lower part of the neck of the hollow body during the final blow molding operation. It can particularly be provided with a screw thread. However, since the material constituting the preform is, during final blow molding, at a temperature considerably different from the ideal temperature for molding fine details, it is preferable, to the extent possible, to avoid forming molded shapes having very small radii of curvature, for example smaller than 1 mm.

The process according to the invention can be utilized to produce oriented hollow bodies starting from any thermoplastic material which is capable of being molecularly oriented by stretching. By way of example of these latters, one can cite resins having a preponderant content of vinyl chloride, polyolefins, acrylic copolymers having a high nitrile acrylic content, thermoplastic polyesters such as polyterephtalate of ethyleneglycol, and polycarbonates.

The process according to the invention can be easily carried out by means of simple apparatus composed of preform blowing molds whose mold cavity assures molding of the orifice collar in its definitive form, and of final blow molds whose mold cavity assures precise positioning of the orifice collar and molding of the lower part of the neck of the finished body.

Use can very advantageously be made of apparatus derived, with the necessary changes, from that described in Belgian Pat. No. 837,324, filed on Jan. 6, 1976. In this case, the apparatus includes a preform blowing machine which is supplied with a continuous tubular parison of thermoplastic material and the molds of which, aligned end to end in a connected manner on a first rotary support, present appropriate mold cavities permitting the production of a false neck, a thermal conditioning device bringing the preforms to the orientation temperature, a final blow molding machine composed of a plurality of molds mounted on a second rotary support and equally presenting appropriate mold cavities, and a transfer device constituted by an endless chain equipped with supports, assuring transfer of the preforms from the preform blowing machine to the final blowing machine while causing them to pass through the thermal conditioning device.

In such an apparatus, contrary to that which is specifically described in the above-cited Belgian Pat. No. 837,324, it is not necessary to provide a deflashing device for the preform necks ahead of the final blowing machine since these false necks can be retained during the final blowing operation. However, when the molds equipping the preform blowing machine are constructed in a manner to produce preforms whose false necks are closed, as is the case, for example, when molding of the preforms is effectuated by blowing by means of a hollow needle which laterally pierces successive parison portions enclosed in the preform molds, it is useful to provide a device, for example similar to that described in Belgian Pat. No. 837,324, to open these false necks ahead of the final blow molding machine, for example by removing their upper part. This device can however be mounted directly in the preform blowing molds and be constituted by movable blades which are operated after blowing of the preforms and transversely cut the molded false neck at a certain distance from the orifice collars provided on the preforms.

The supports, or fittings, equipping the preform transfer chain are, preferably, adapted in a manner to seize these preforms at the level of their false neck during transfers. It is however possible to provide supports adapted to support the preforms below their orifice collars as is described in Belgian Pat. No. 837,324.

The final blow molding machine can be analogous to that described in Belgian Pat. No. 837,324. It is preferable that the blowing nozzles equipping this machine be of the same type as that described in Belgian Pat. No. 838,910.

This final blow molding machine can very advantageously be equipped with extendable radial arms provided at their extremities with jaws arranged to seize the false neck of each preform, with at least the upper part of the false neck extending out of the final blow mold. After opening of the final blow mold, the associated radial arm can be utilized to positively extract the finished hollow body from the mold, to displace it from the final blow molding machine and to transfer it, for example, onto a transporter which removes the hollow body toward a cut-off installation, where the false neck is eliminated.

An embodiment of the invention is illustrated in the accompanying drawings which relate to molds which are particularly suitable for performing the process of the invention by means of an apparatus such as that described in Belgian Pat. No. 837,324. It is however understood that these figures are presented by way of example and are not intended to limit the scope of the present invention.

BRIEF DESCRIPTION OF THE DRAWINGS

FIG. 3 is a partly cross-sectional, elevational view illustrating removal of a finally molded oriented hollow body from the final blow mold of FIG. 2.

DESCRIPTION OF THE PREFERRED EMBODIMENTS

Figure 1:
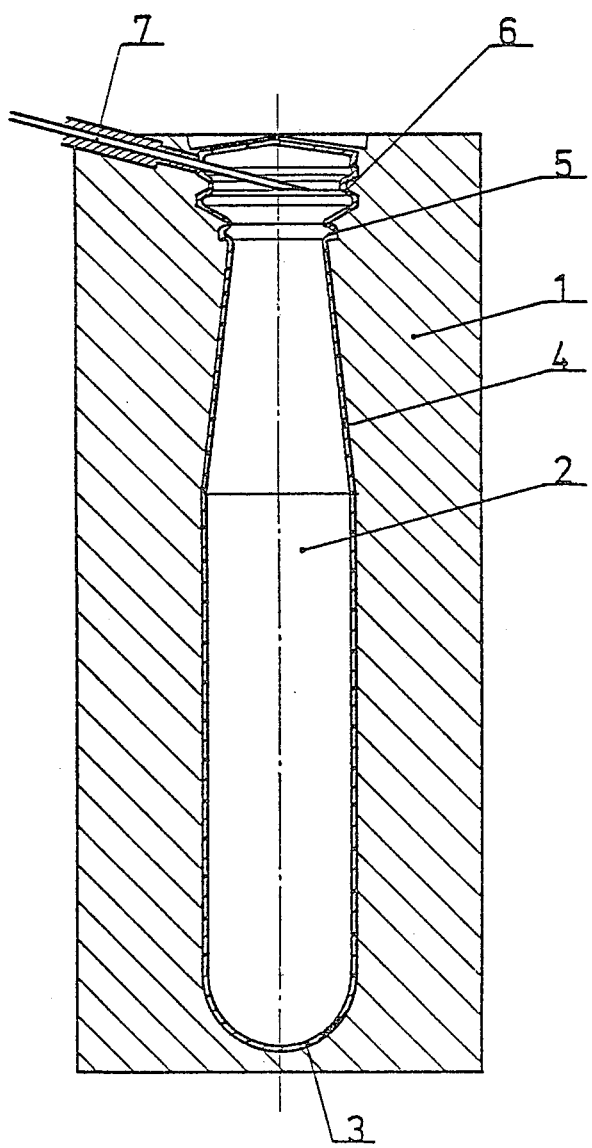
FIG. 1 is an elevational, cross-sectional view of a particularly suitable preform blowing mold for carrying out the method according to the invention.

FIG. 1 illustrates a preform mold 1 which can be mounted together with other, identical, molds on a rotary blow molding machine (not shown). Preform mold 1 is formed to present a mold cavity 2 which is formed to permit a hot tubular parison of thermoplastic material to be blow molded into a preform having a closed hemispherical base 3, a generally cylindrical body 4, an orifice collar 5 molded into its definitive form, and a closed false neck 6 surmounting collar 5. The molding of the preform is effected by blowing via a retractable hollow needle 7 which pierces the parison in the region intended to form the false neck and which is connected, in a manner known per se, to a source of pressure fluid (not shown). The walls of mold 1 are equipped with coolant channels (not shown) whose purpose is to carry cooling fluid which cools the molded preform in order to permit it to be unmolded and possibly to assure total or partial thermal conditioning of the preform. The length of the molded preform is measurably less than the height of the oriented final hollow body to be subsequently produced and its diameter is clearly less than the maximum diameter of that oriented final hollow body.

After molding and cooling, the preform is withdrawn from mold 1 and is transferred, while passing through a thermal conditioning device, toward the final blow mold. During this transfer, the upper part of the false neck 6 is cut in order to open the top of the preform. The transfer means grip the preform at the level of its false neck 6 and cooperate with an annular groove which is formed therein in such a manner that the upper part of the false neck 6 is exposed in order to permit this part to be cut off.

Figure 2:
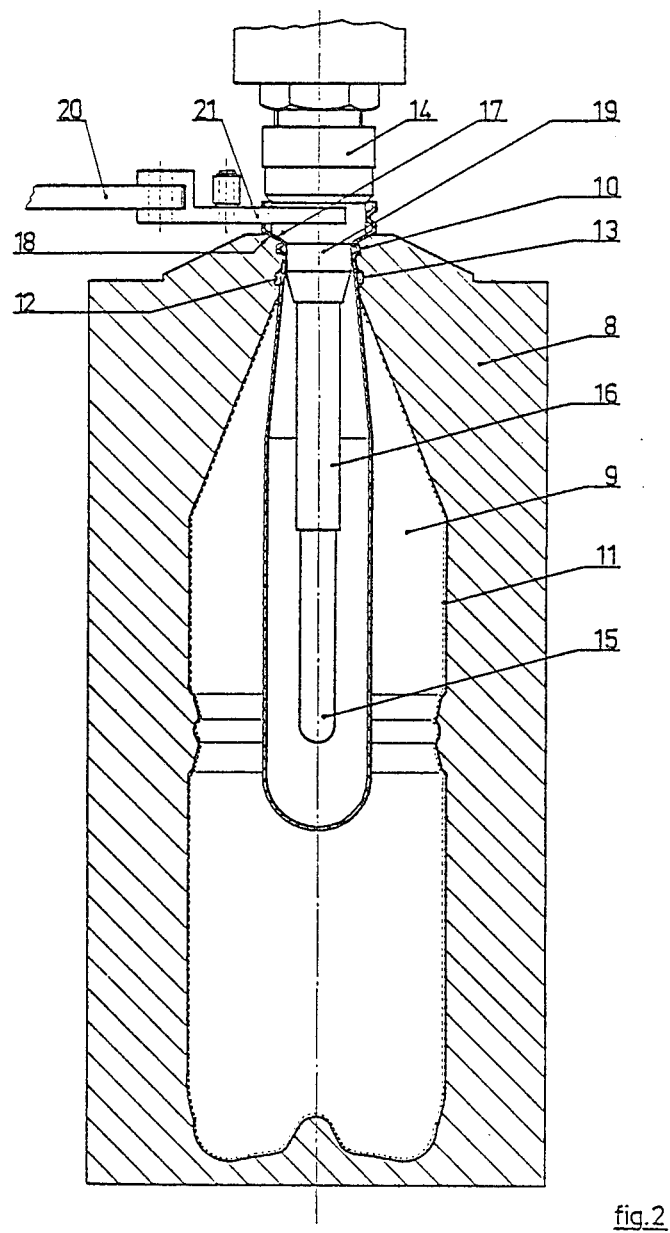
FIG. 2 is a view similar to that of FIG. 1 of a suitable final blowing mold for carrying out the method according to the invention.

The thermally conditioned preform, with the upper part of the false neck 6 removed, is then introduced into the final blow mold 8 shown in FIG. 2, mold 8 being mounted on a rotary support which is not illustrated.

Mold 8 presents a mold cavity 9 which is formed to define the shape of the desired final body and which includes a recess 10 shaped to permit precise positioning of the orifice collar 5 which has already been molded into its definitive form on the preform. The introduction of the preform into the mold 8 is effected in such a manner that, during closing of the mold, the orifice collar 5 comes to lodge in a precise manner in the recess 10. This introduction can in particular be assured, for example under the action of the preform transfer device, through the intermediary of the false neck 6.

The cavity 9 in mold 8 reproduces the form of the desired oriented hollow body 11 and includes particularly a recess, or relief, 12 permitting formation, during final blow molding, of the lower part of the neck 13 of the final hollow body.

The open false neck 6 of the preform extends out of the mold 8 during the final blow molding operation. It is utilized to assure maintenance of a tight seal at the top of the preform during final blow molding. To this end, the blowing nozzle 14 is provided with a shoulder 17 which bears against the interior of the lower portion of the false neck 6 and firmly presses the latter against the rim 18 of the mold opening. The blowing nozzle 14 carries a dimensioning sleeve 19 which precisely determines the diameter of the opening defined by the neck of the hollow body 11, and assures proper sealing and holding of the preform during the final blow molding operation.

The blowing nozzle is further provided with a piston 15 surrounded by a bush 16, the piston and bush together defining an annular chamber for conducting the pressure fluid into the preform. These elements are already known in the art.

The rotary final blow molding machine is provided with a series of extendable radial arms 20 which each cooperate with a respective final blow mold 8. The end of each of the arms 20 is equipped with a gripper having movable jaws 21 arranged to seize a preform at its false neck 6 whose upper portion extends out of the final blow mold 8.

As shown in FIG. 3, after opening of the final blow mold 8 and retraction of the blowing nozzle 14, the molded, oriented, final hollow body is maintained by jaws 21 which thus assure its unmolding from the cavity 9 of mold 8. Then, the arm 20 can be extended to withdraw the molded, oriented hollow body 11 radially from the final blow molding machine and to lead body 11 onto a removal transporter 22, after which it is released by opening jaws 21. The control of each radial arm 20 can be effectuated by mechanical means such as cams or by electric, pneumatic or hydraulic means. The extension movement of each radial arm 20 can be amplified by known devices such as rack and pinion mechanisms. The radial arms equipped with grippers 21 can equally be used for performing an inverse movement to assure introduction of the thermally conditioned preforms into the final blow molds 8.

As a result of the present invention, it becomes easy to produce, with a remarkably high production rate, oriented hollow bodies of plastic material to which it is easy to subsequently apply closures, such as bottle caps, in a manner to produce a very tight seal. Therefore, bottles produced according to the present invention are particularly suitable for the packaging of carbonated beverages such as beer and soft drinks.

It will be understood that the above description of the present invention is susceptible to various modifications, changes and adaptations, and the same are intended to be comprehended within the meaning and range of equivalents of the appended claims.

What is claimed is:

1. In a process for the production of an oriented hollow body of thermoplastic material provided with a neck finish composed of an upper molded part having an axially symmetrical outer surface and presenting an orifice collar and a lower molded part, by initially blow molding a hot tubular parison of thermoplastic material in a preform mold to produce a preform, conveying the preform from the preform mold to a final blow mold, thermally conditioning the resulting preform to a temperature capable of inducing orientation of the thermoplastic material during subsequent stretching, and finally blow molding the preform to produce the desired final hollow body, the improvement wherein said step of initially blow molding is carried out in a manner to give only the orifice collar its definitive form and to produce a false neck located above the orifice collar, said step of conveying is effected in a manner to allow the preform to assume any arbitrary orientation about its longitudinal axis during introduction into the final blow mold, and said step of finally blow molding is carried out in a manner to form the lower molded part of the neck finish below the orifice collar.

2. A process as defined in claim 1 wherein said step of finally blow molding is carried out in a manner to stretch the part of the preform which constitutes the lower molded part of the neck finish.

3. A process as defined in claim 2 wherein said step of thermally conditioning is carried out in a manner to heat the part of the neck finish of the preform below the orifice collar to a temperature higher than that of the rest of the preform.

4. A process as defined in claim 1 wherein said step of finally blow molding is carried out by means of a blowing nozzle which bears directly against the orifice collar in order to provide a seal between the blowing nozzle and the preform.

5. A process as defined in claim 1 wherein said step of finally blow molding is carried out in a mold out of which at least the upper part of the false neck projects.

6. A process as defined in claim 1 further comprising transferring the preform between said steps of initially blow molding, thermally conditioning and finally blow molding, by gripping the preform, or final hollow body, respectively, at the level of its false neck.

7. A process as defined in claim 1 further comprising positioning the preform by means of its false neck for said said step of finally blow molding.

8. A process as defined in claim 1 wherein said step of initially blow molding is carried out by inserting a retractable hollow needle at the level of the false neck.

9. A process as defined in claim 1 wherein said step of initially blow molding is carried out to produce a preform having a hemispherical base and a generally cylindrical body.

10. A process as defined in claim 1 wherein said step of finally blow molding is carried out by means of a nozzle which bears against the false neck in order to establish a seal between the nozzle and the preform.

11. A process as defined in claim 1 wherein said step of finally blow molding is carried out to give the lower molded part of the neck finish an axially asymmetrical outer surface.

* * * * *